United States Patent

Madsen et al.

[15] 3,638,028
[45] Jan. 25, 1972

[54] PUNCHED TAPE READER WITH STEPPING MOTOR AND SPROCKET DRIVE

[72] Inventors: Elmer Madsen; Hermann Rosshirt, both of Bristol, Conn.

[73] Assignee: The Superior Electric Company, Bristol, Conn.

[22] Filed: June 17, 1968

[21] Appl. No.: 737,399

[52] U.S. Cl. ...................................250/219 D, 226/8, 226/120
[51] Int. Cl. ....................................................G01n 21/30
[58] Field of Search ..............250/219 D; 235/61.115; 226/8, 226/120; 318/696, 685

[56] References Cited

UNITED STATES PATENTS

| | | | |
|---|---|---|---|
| 3,055,582 | 9/1962 | Battison et al. | 250/219 D X |
| 3,055,583 | 9/1962 | Demer | 250/219 D X |
| 3,117,268 | 1/1964 | Madsen | 310/49 X |
| 3,119,020 | 1/1964 | Olson et al. | 250/219 D |
| 3,317,735 | 5/1967 | Elsässer | 250/219 D |
| 2,750,548 | 6/1956 | Van Dalen | 318/696 |

FOREIGN PATENTS OR APPLICATIONS

| | | | |
|---|---|---|---|
| 628,701 | 11/1961 | Italy | 250/219 D |

Primary Examiner—Archie R. Borchelt
Assistant Examiner—D. C. Nelms
Attorney—Johnson & Kline

[57] ABSTRACT

A reader for reading the coded perforations in a punched tape to supply electrical signals representative thereof that has a sprocket wheel drive that is directly connected to the axis of a stepping motor with the motor taking a plurality of steps for each incremental movement of the tape and in which photodiodes and a light source are used for reading so as to be accurately responsive over a wide range of light permeability of the tape.

3 Claims, 5 Drawing Figures

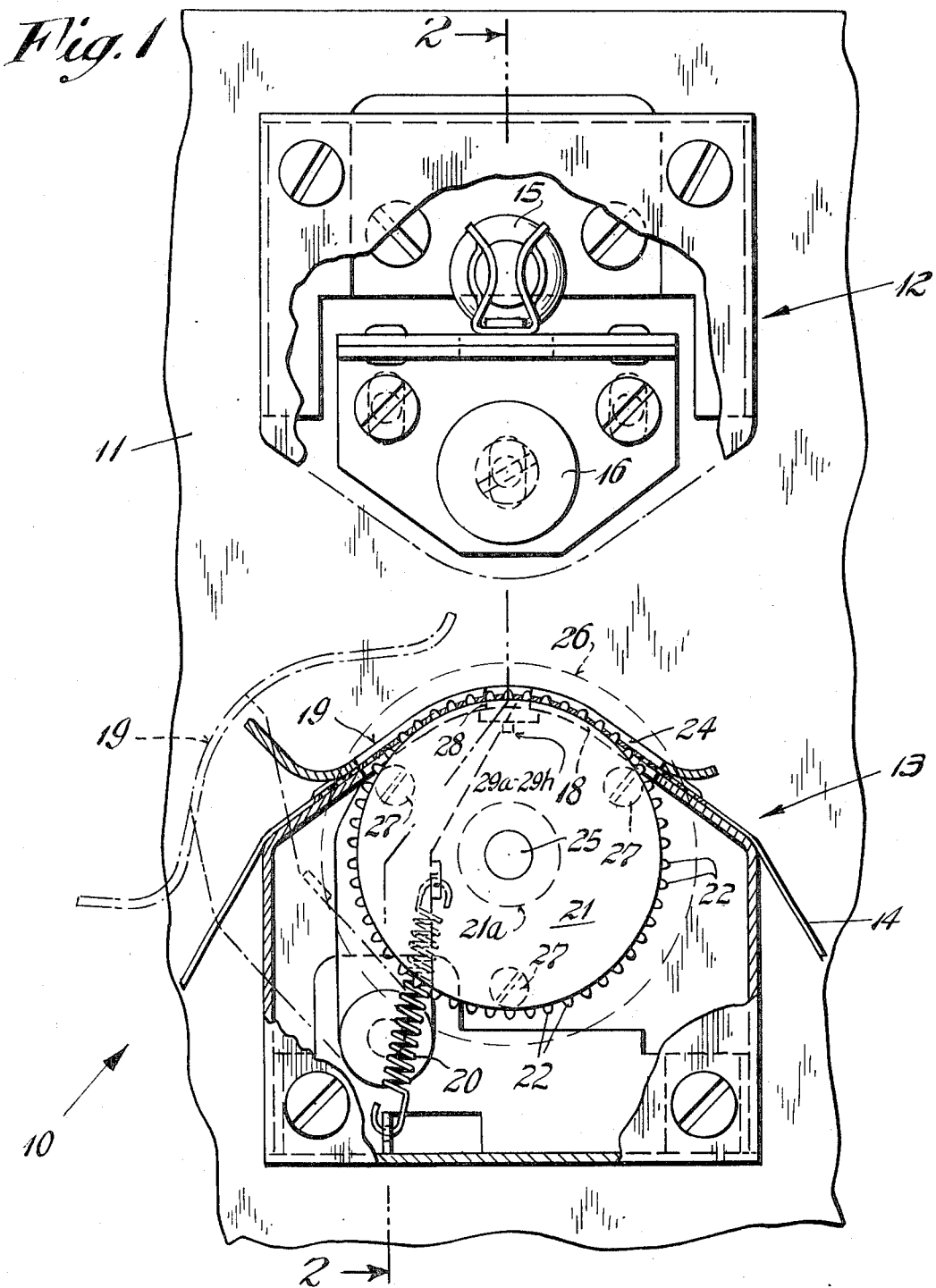

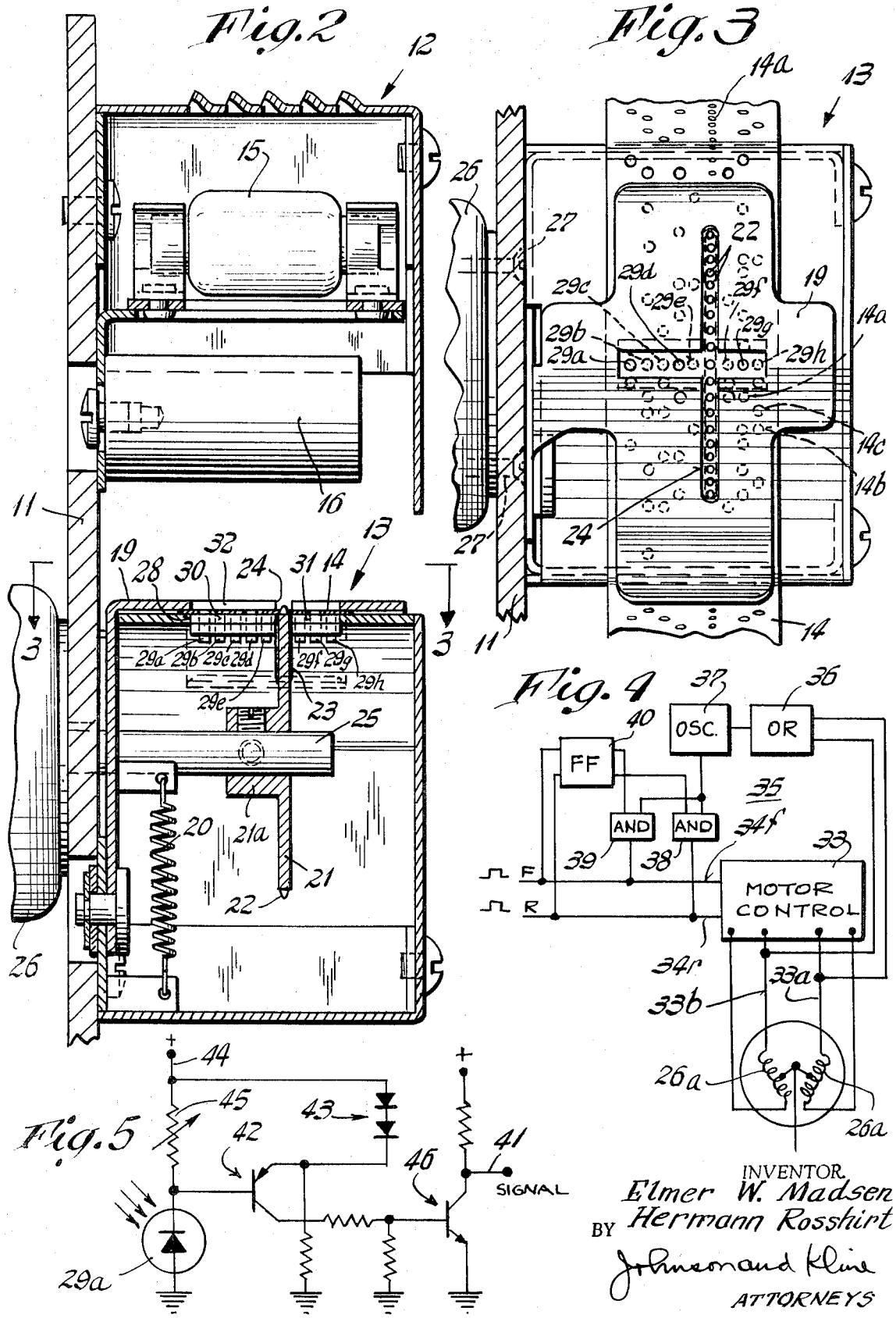

PUNCHED TAPE READER WITH STEPPING MOTOR AND SPROCKET DRIVE

In the heretofore suggested construction of tape readers, difficulties have been encountered in producing a reader that not only accurately read the perforations in the tape under a wide range of conditions but also one which operated trouble-free over a long period of time. While it is recognized that electronic solid-state sensing elements were longer lasting and more trouble-free than mechanical sensing elements, such as fingers or switches, solid-state sensing elements were apt to be somewhat limited with respect to the range of conditions over which they were accurate and thus were not as sufficiently versatile as mechanical readers. One condition that limited the use of photoresponsive sensing elements was the variation in the opacity or light transmission of the tape material which changed the ratio of light transmitted between a perforation or hole and a "no-hole." Though a tape which is completely opaque was capable of being accurately read by photoresponsive elements, as its translucence increased, the chance or error increased as the ratio decreased. This is especially true with the tapes made of paper which may be saturated unintentionally with oil in some places which markedly increases its transparency at the oil spot.

Another factor which also limited the operational versatility was the inability to precisely align a perforation with a photoresponsive element so that substantially all the light passing through a perforation would impinge on the element. With misalignment, the ratio of hole to no-hole light would decrease as the quantity of light for a hole is less while the no-hole light remains the same.

It is accordingly an object of the present invention to provide a perforated tape reader that is extremely durable and capable of functioning for an extended period without malfunctioning.

Another object of the present invention is to provide a perforated tape reader which not only achieves the above object but yet which is capable of accurately reading without adjustment tapes formed of material having a wide range of translucency.

A further object of the present invention is to provide a tape reader which is substantially devoid of mechanical devices and which utilizes a stepping motor that is capable of accurately positioning the perforations with respect to the photoresponsive sensing elements.

In carrying out the present invention, there is provided a perforated tape reader which supplies electrical signals according to coded perforations in a length of tape. The code in perforations for one signal consists of a transverse section or row of the tape that is subdivided into a plurality of areas with each area having either a perforation or not and the location of the holes and no-holes in the row constituting the code. The tape is composed of a plurality of rows, each being accurately spaced from adjacent rows and when a row is positioned with respect to sensing elements an electrical signal is provided which is in accordance with the presence or absence of a perforation in each area. After providing this signal the tape is advanced to position the next row for reading by the sensing elements.

The movement of the tape is produced by a stepping motor which has a relatively large sprocket wheel secured directly on its shaft with projections on the periphery of the wheel engaging a plurality (more than five) of the drive holes in the tape. The motor functions upon receiving a command to move the tape to the next row, by taking a plurality of steps to achieve the movement. With this structure, it is assured that the next row to be read will be accurately positioned with respect to the sensing photoresponsive elements and that the perforations in the row will be accurately aligned with the sensing elements.

The photoresponsive elements, as herein specifically disclosed are photodiodes and each is electrically connected to be normally back-biased, and nonconducting until a level of light impinges thereon when they become conductive. At the predetermined light level, the conductance of the photodiode is used to decrease the potential at the base of a transistor, causing it to conduct and provide a signal that a perforation is present in the area of the row that is in alignment with the photodiode. There is one photodiode for each area in a row where a perforation may exist, and the output signal accordingly consists of a plurality of separate voltage levels with there being a voltage level for each area and with the voltage level indicating the presence or absence of a perforation in the area.

Other features and advantages will hereinafter appear. In the drawing:

FIG. 1 is an elevation, partly in section and with portions removed, of the perforated tape reader of the present invention.

FIG. 2 is a vertical section taken along the line 2—2 of FIG. 1.

FIG. 3 is a view looking in the direction of line 3—3 of FIG. 2.

FIG. 4 is a block diagram of circuitry for controlling the stepping motor.

FIG. 5 is a schematic illustration of one photoresponsive cell and its circuitry for producing a signal.

Referring to the drawing, the perforated tape reader of the present invention is generally indicated by the reference numeral 10 and includes a relatively thick, flat rigid plate forming a back support 11 on which is mounted, in spaced relation, an upper housing 12 and a lower housing 13. A length of perforated tape 14 is guided over the exterior upper surface of the lower housing to be read as will be hereinafter understood.

The upper housing 12 has mounted therein an incandescent bulb 15 and a lens 16 with the lens, as shown, being elongate and substantially cylindrical. The lens serves to concentrate the light from the bulb into a thin line that impinges on the upper surface of the lower housing 13. The bottom surface of the upper housing 12 is open to enable the light passage.

The lower housing 13 has an exterior upper convex surface 18 onto which the tape 14 is pressed by a tape guide cover 19 that has the shape shown. The tape guide cover is movable from its dotted line, open position, to a position where it engages the top surface of the tape so that the tape rides between the bottom surface of the tape guide cover and the upper convex surface 18. An overcenter spring 20 tensions the guide cover 19 at one or the other of its positions and to which it is manually movable.

The tape 14 (FIG. 3) is formed with a plurality of tape drive holes 14a, there being one hole for each transverse row of perforations 14b, 14c, 14d, etc., with the drive hole being accurately positioned in the transverse row. For moving the tape by engagement with the drive holes 14a, the tape reader of the present invention includes a sprocket wheel 21 having a plurality of radially extending projections 22 on its periphery. The projections are spaced a distance which accurately corresponds to the spacing between the drive holes 14a. To enable engagement of the projections with the tape the housing upper surface 18 is formed with a longitudinal slot 23 through which a substantial portion of the periphery of the sprocket wheel extends. Additionally the tape guide cover 19 is also provided with a slot 24 which enables the projections 22 to extend through the tape holes 14a and into the slot 24. The sprocket wheel 21 has a hub 21a that is made fast to a shaft 25 that forms part of a motor 26. The motor 26 may be fastened as by screws 27 to the back part of the plate support 11 with its shaft 25 projecting into the housing 13.

Each of the drive holes 14a is aligned with a transverse row of the tape which in the embodiment shown has eight equispaced areas in which a perforation may be formed with five areas occurring on one side of the drive holes 14a and three on the other side. The herein described reader has a photodiode for each of the areas where a perforation may exist and the photodiodes are secured on the housing 13 adjacent a transverse cutout 28. The photodiodes are indicated by the reference characters 29a–29h with the photodiodes 29a–29 being secured in unitary mounting block 30 and the photodiodes 29f–29e being secured in another unitary mounting block 31. The two blocks are secured on the housing, as by an adhesive, to be on different sides of the sprocket wheel and aligned with the cutout 28 such that they are then positioned to receive light from the lens 16. Additionally the guide cover 19 also has a light-passing cutout 32.

The photodiodes 29a–29h, as shown in FIG. 1 are secured to be in a row which is in alignment with the axis of the shaft 25 and at the apex of the convex surface 18. Thus the photodiodes are at the midpoint of the number of projections of the sprocket wheel that engages the tape drive holes so that an equal number of projections engages the tape on either side of the photodiodes. Moreover the row of photodiodes are accurately positioned transversely of the tape to be in alignment with each's respective area of the row and close to the bottom surface of the tape. The lateral spacing of the diodes and the closeness thereof to the tape is such that light that passes through a perforation in one area will not diverge and effect an adjoining diode.

The motor 26 is of the stepping type in that it will advance one step or increment of movement for each change of energization applied to its windings 26a. A motor control 33 (FIG. 4) has a pair of inputs 34f and 34r and a pulse received on either input will cause the motor control to change the energization of the windings 26a to produce one incremental movement. A change of energization to the windings 26a to produce one incremental movement. A change of energization to the windings 26a to produce a step consists of altering the pair of windings which are energized and the sequence of energization has four different possible winding combinations that may be energized so that the sequence repeats itself after every four steps. Such a motor and motor control is available from the assignee of the present invention and is more fully disclosed in U.S. Pat. No. 3,117,268.

The motor 26 is energized to move the tape the distance between a transverse row by having the motor move a plurality of steps rather than just one step by use of logic circuitry 35. This circuit includes an OR-gate 36, an oscillator 37, AND-gates 38 and 39 and a flip-flop 40. One energization of the windings for producing a step includes deenergization of both leads 33a and 33b and this deenergization only occurs once in the sequence of four steps of winding energizations.

It will thus be understood that when a pulse is received along either of the leads 34f or 34r to command the motor to move the tape to position the next row in alignment with the photodiodes 29a–29h, the motor control 33 will respond by changing the energization of the windings 26 so that one of the leads 33a and 33b are now energized as the next winding energization in the sequence is effected. The change in having one or both the leads 33a and 33b energized will pass a signal through the OR-gate 36 which will activate the oscillator 37 to provide output pulses to the inputs of AND-gates 38 and 39. The flip-flop 40 is a bistable flip-flop provided for directional control and upon receipt of a pulse on either channel will provide a voltage to one or the other AND-gates 38 and 39 depending on which input 34f or 34r the command pulse was receiving. This in turn will permit the pulses from the oscillator 37 to pass only through the AND gate that is connected to the same input on which the first pulse was received while the other AND gate blocks pulses to the other input. The motor control will accept the pulses from the oscillator and continue to provide changes of energization to the windings until the sequence is repeated where leads 33a and 33b are both deenergized when the OR-gate 36 will then not pass a signal to the oscillator 37 which will cease functioning. Thus, whenever a command is received on either input 34f or 34r from other circuitry to cause the advancement of the tape from one row to the next, the motor 26 will take four steps prior to ceasing movement. The dimensions of the sprocket wheel and the length of movement of the motor steps are correlated so that the peripheral movement of the sprocket is the exact length between transverse rows in the tape.

With such a construction it has been found that though the motor at the end of a step tends to oscillate, that by using a plurality of steps, the oscillation of one step is reduced by the fraction of the number of steps taken for the movement. Accordingly, in the herein described embodiment only one-fourth of the oscillation which one step produces occurs which substantially minimizes the movement of the tape after completion of the steps.

As shown in FIG. 1, the upper convex surface 18 is essentially an arc of a circle having a slightly larger radius than that of the sprocket wheel 21. Accordingly, the wheel 21 is capable of having approximately 14 projections 22 engage drive holes 14a in the tape. The large number of engaged projections serve to decrease bunching or spreading of the tape which further aids in the accurate positioning of the transverse row with respect to the photodiodes.

Shown in FIG. 5 is an electrical schematic diagram of one photodiode as, for example, photodiode 29a and the components of its circuit which translates at a terminal 41, a signal indicative of whether light is impinging on the photodiode 29a or not and hence the presence or absence of a perforation, it being understood that a similar circuit is provided for each of the diodes so that the output signal of the reader is at 8 terminals each like the terminal 41. Specifically, the terminal 41 is a plus 15 volts for a no-hole area and essentially ground if a perforation occurs.

A transistor 42 has a pair of series-connected diodes 43 connected between its emitter and a positive DC source 44 while its base is connected through an adjustable resistor 45 to the source 44. The photodiode 29a has its cathode also connected to the base of the transistor 42 and its anode to ground. The resistor 45 is adjusted such that there is initially about a 2-volt potential between the emitter and base without any light impinging upon the photodiode. As light strikes the photodiode, even though it is back biased, it permits conduction of current reversely through it until its resistance had been decreased by a sufficient amount of light so that enough current flows to decrease the potential of the base below that of the emitter at which time transistor 42 conducts. This in turn causes conduction of the other transistor 46 and shifts the potential of the terminal 41 from a positive potential to essential ground.

The tape 14 may consist of many materials from opaque plastic foil to paper with each material having its own characteristics of translucency. Especially the paper tape is apt to have a variation in its translucence caused by contaminants such as oil. However, with the present invention, the use of the sprocket wheel and plural step motor 26 in addition to the utilization of the circuit shown in FIG. 5 enables the present reader to accurately read tapes having a wide range of translucency without adjusting for each tape. This is achieved by the accurate positioning of the perforations with respect to the photodiode maintaining a substantially constant area of the photodiode exposed to the light from the bulb 15 and thus minimizing a variable which would decrease the range of sensitivity. Moreover, the photodiode 29a by being back biased initially will conduct at a certain light level with the trip point being adjustable by the bias on the transistor 42. Until conduction occurs, the transistor 42 remains nonconducting and when it does occur, there is a fast, positive reaction. One example of photodiode which may be used is a silicon photodiode No. FPM7019.

It will accordingly be appreciated that there has been disclosed a perforated tape reader which is capable of accurately reading coded perforations even with substantial variations in the opacity of the tape material and over an extended period without malfunctioning. This is achieved by the use of accurately positioning each row of perforations in alignment with photodiodes by the use of a stepping motor which directly drives a sprocket wheel which in turn moves the tape by engaging the tape drive holes. Especially, the stepping motor is caused to make a plurality of steps in order to provide sufficient movement of the sprocket wheel to have the tape advanced from one row to the next.

Variations and modifications may be made within the scope of the claims and portions of the improvements may be used without others.

We claim:

1. A tape reader for providing electrical signals from a length of perforated tape corresponding to the presence or absence of holes with the holes appearing in spaced transverse rows and with the tape having drive holes comprising means extending transversely of the tape for providing a signal indicative of the presence and absence of holes in a row and means for incrementally advancing the tape from one row to the next, said signal providing means including a line of photoelectric cells aligned transversely of the tape to underlie the tape with there being a photocell for each hole in the row, said advancing means including a sprocket having a plurality of equally spaced projections with less than a third of the projections engageable with the tape drive holes whereby only a small peripheral portion of the sprocket engages the tape at a time and in which the small portion is located at the signal-indicating means, a stepping motor having a shaft on which said sprocket is mounted, means for providing changes of energization to the motor with each change producing a step of essentially constant length and means for providing a plurality of changes of energization to produce a plurality of steps for each movement of the tape from one transverse row to the next upon receipt of a command whereby the motor provides a plurality of steps for advancing the tape from one row to the next, said motor shaft extending transversely to the tape with the line of photocells being aligned therewith with some of the photocells being on one side of the sprocket wheel and the remaining photocells being on the other side, and in which the plurality of steps causes each row to be positioned above all the photocells in alignment therewith whereby each tape movement positions the next row of the tape to be positioned over the line of photocells.

2. The invention as defined in claim 1 in which there are guide means for guiding the tape including a convex surface, said surface being convex about the sprocket wheel to increase the number of projections that are engageable with the tape drive holes, in which the convex surface includes a slot extending along the path of movement of the tape, in which the few projections on the periphery of the sprocket wheel extend through the slot to engage the tape and in which the line of photocells is located adjacent the top of the convex surface.

3. The invention as defined in claim 1 in which the change of energization providing means provides a change for each pulse received thereby, in which the plurality of changes of energization providing means includes an oscillator for providing pulses to said change of energization providing means, in which there are circuit means for causing said oscillator to provide one less pulse than the number of changes of energization required to move the tape from one transverse row to the next and in which the change of energization providing means produces a change of energization upon receipt of a pulse from an external command.

* * * * *